(12) United States Patent
Kang et al.

(10) Patent No.: US 11,232,269 B2
(45) Date of Patent: Jan. 25, 2022

(54) METHOD AND APPARATUS FOR PROCESSING DATA

(71) Applicants: Se-Jong Kang, Yongin-si (KR); Kwangsea An, Seoul (KR); Younghui Kim, Beaverton, OR (US)

(72) Inventors: Se-Jong Kang, Yongin-si (KR); Kwangsea An, Seoul (KR); Younghui Kim, Beaverton, OR (US)

( * ) Notice: Subject to any disclaimer, the term of this patent is extended or adjusted under 35 U.S.C. 154(b) by 909 days.

(21) Appl. No.: 15/710,848

(22) Filed: Sep. 21, 2017

(65) Prior Publication Data
US 2018/0173700 A1 Jun. 21, 2018

(30) Foreign Application Priority Data

Dec. 19, 2016 (KR) .................. 10-2016-0173491

(51) Int. Cl.
| | | |
|---|---|---|
| *G06F 40/56* | (2020.01) | |
| *G06F 9/451* | (2018.01) | |
| *G06F 16/24* | (2019.01) | |
| *G06F 16/28* | (2019.01) | |
| *G06F 40/30* | (2020.01) | |

(52) U.S. Cl.
CPC .............. *G06F 40/56* (2020.01); *G06F 9/453* (2018.02); *G06F 16/24* (2019.01); *G06F 16/283* (2019.01); *G06F 40/30* (2020.01)

(58) Field of Classification Search
CPC .... G06F 16/972; G06F 9/465; G06F 17/2205; G06F 9/5061
See application file for complete search history.

(56) References Cited

U.S. PATENT DOCUMENTS

| | | | |
|---|---|---|---|
| 8,127,095 B1* | 2/2012 | Colgrove | G06F 11/1435 711/162 |
| 2013/0198217 A1* | 8/2013 | Narula | G06F 16/90335 707/759 |
| 2015/0005009 A1* | 1/2015 | Tomkins | H04L 67/22 455/456.3 |
| 2019/0005077 A1* | 1/2019 | Matsuda | G06F 17/30321 |

OTHER PUBLICATIONS

Tatebe et al. ('Grid Data Farm for Petascale Data Intensive Computing', May 2001) (Year: 2001).*

* cited by examiner

*Primary Examiner* — Ken Hoang
(74) *Attorney, Agent, or Firm* — Patent Office of Dr. Chung Park

(57) ABSTRACT

Provided is a data processing method and apparatus for a service that finds and automatically analyzes and processes the semanticity from various types of big data existing at different locations on a network when a user sets a desired combination of conditions and operations.

7 Claims, 15 Drawing Sheets

[FIG. 1]
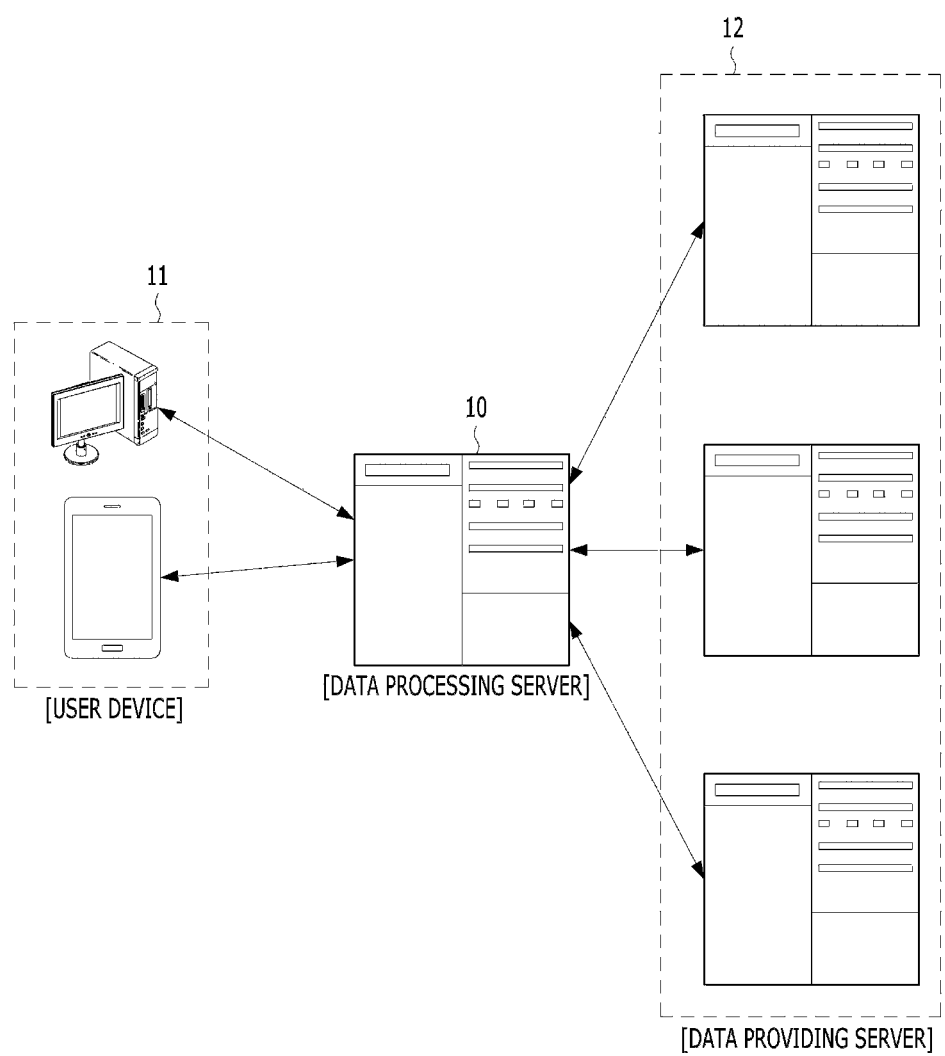

[FIG. 2]
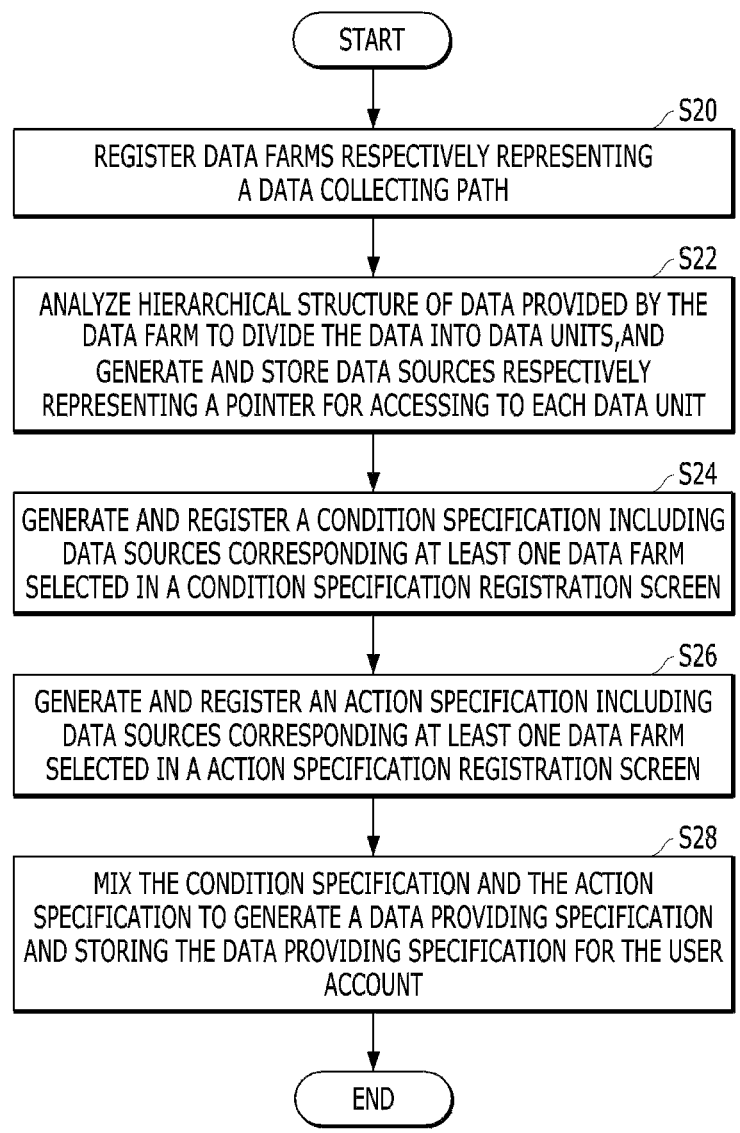

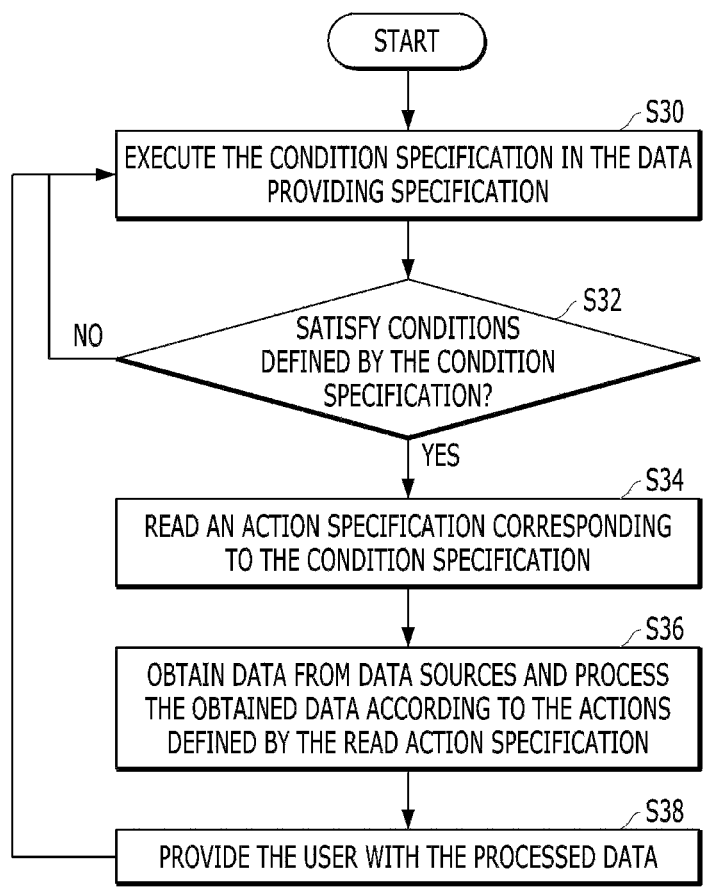
[FIG. 3]

[FIG. 4]
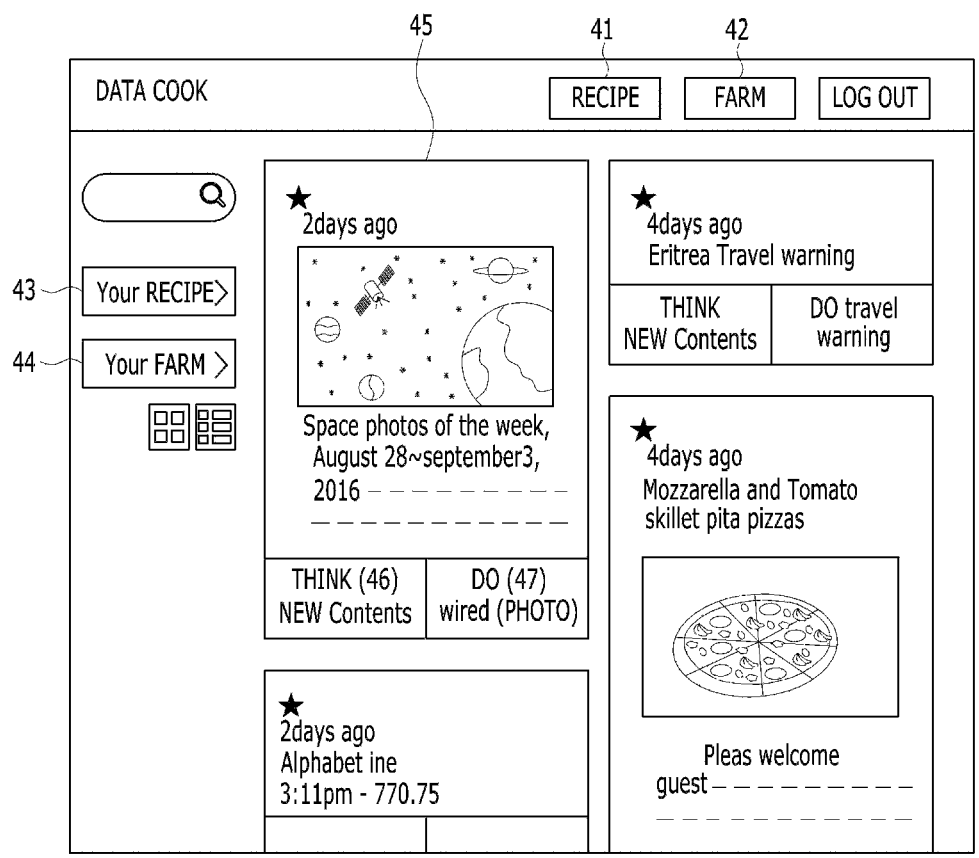

[FIG. 5]
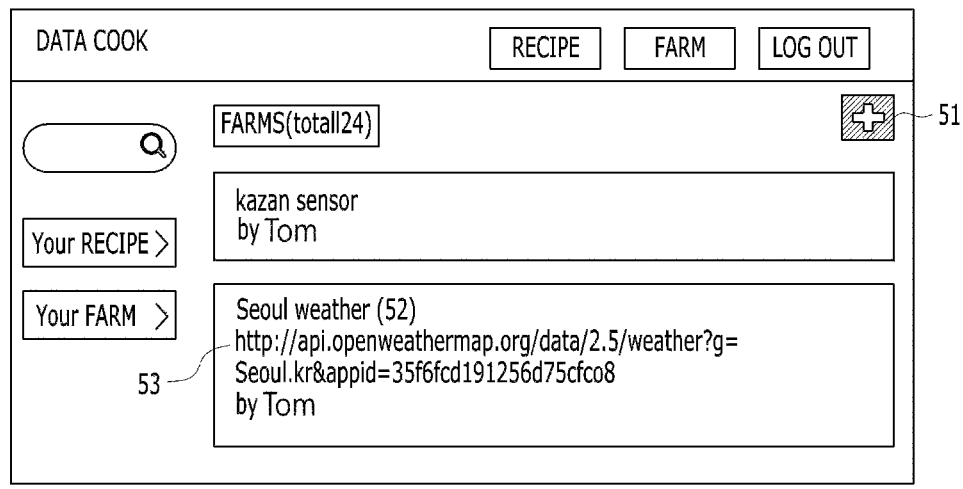
[FIG. 6]
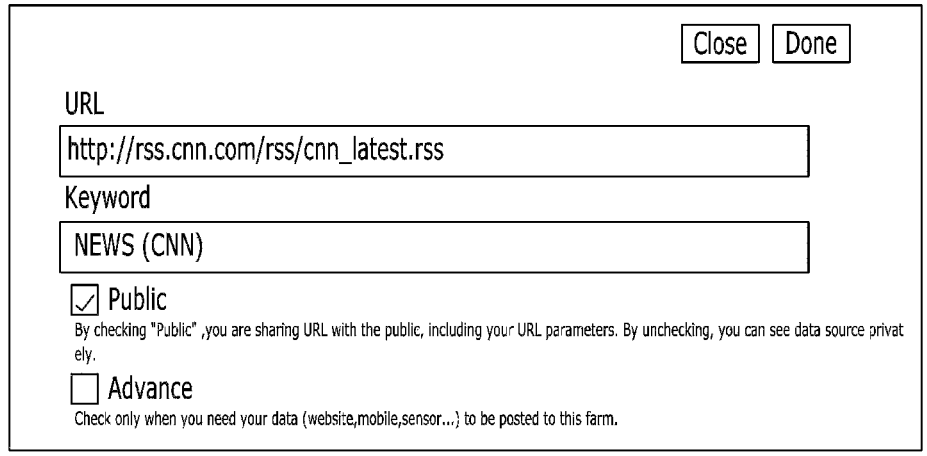

[FIG. 7]
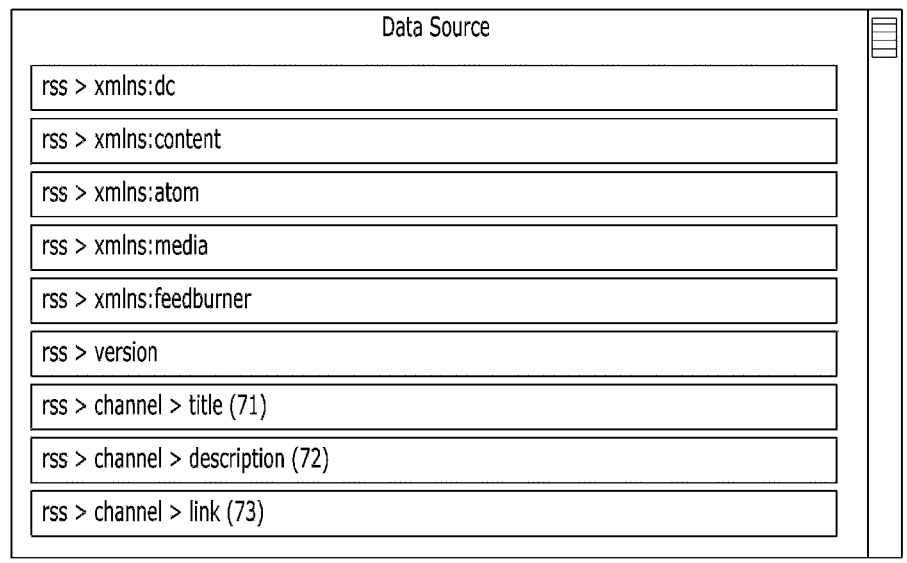
[FIG. 8]
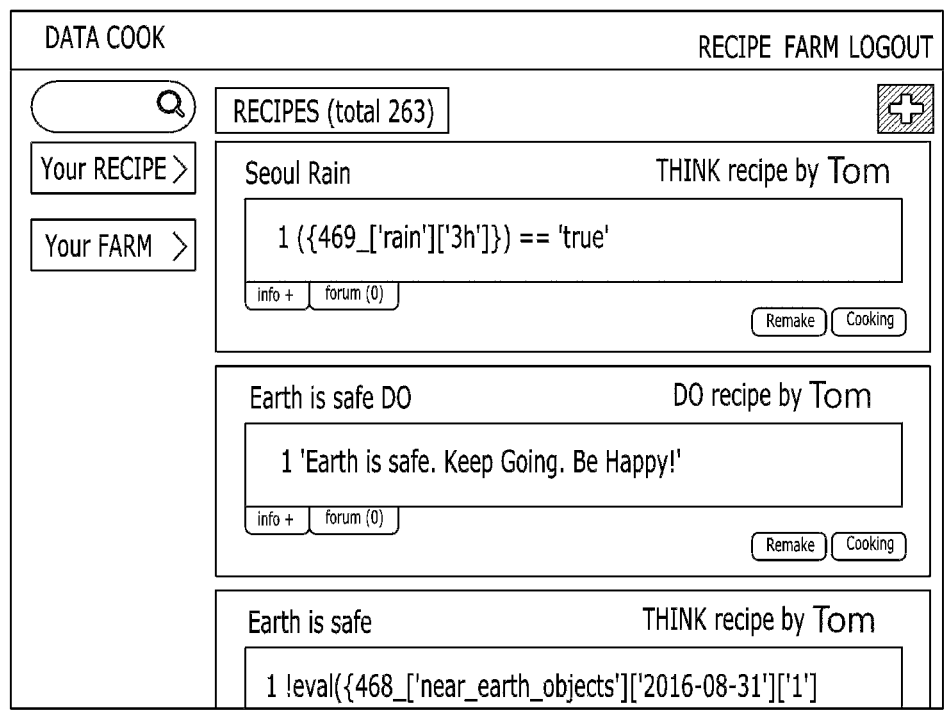

[FIG. 9]
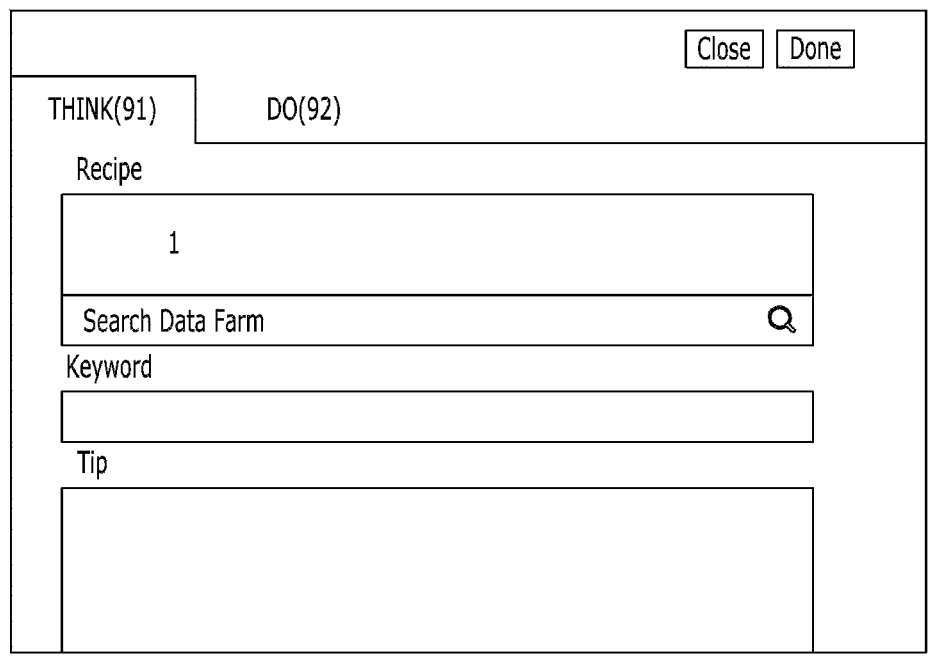
[FIG. 10]
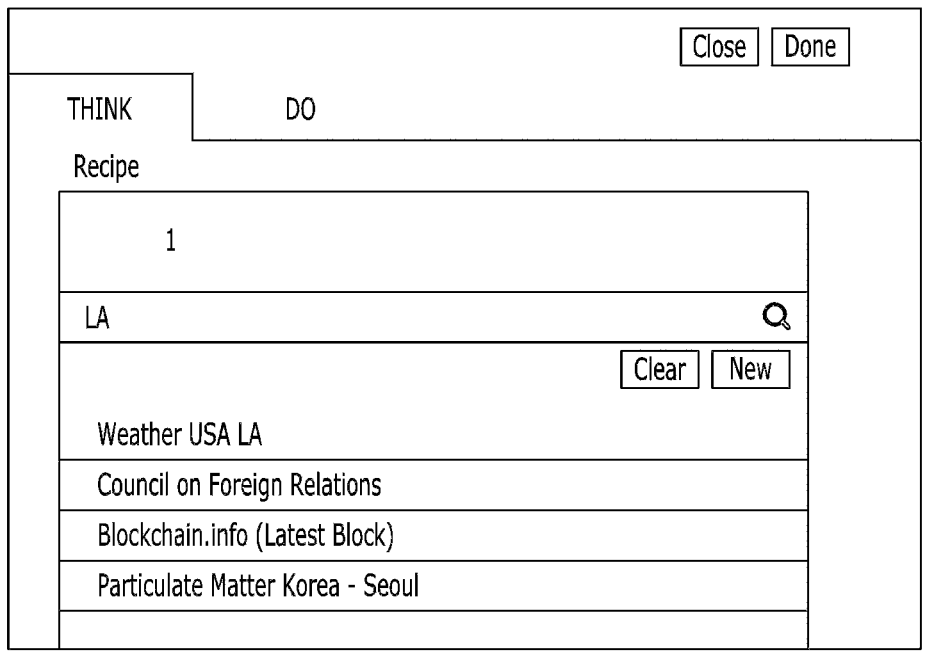

[FIG. 11]

| | Close | Done |
|---|---|---|
| THINK | DO | |

Recipe

1

LA 🔍

| Visibility |
| wind > speed (110) |
| wind > deg |
| clouds > all |
| dt |

[FIG. 12]

| | Close | Done |
|---|---|---|
| THINK | DO | |

Recipe

1 {484_['wind']['speed']} ~121

Search Data Farm 🔍

Keyword

Tip

[FIG. 13]

```
                                                    [Close] [Done]
 THINK          DO
 Recipe 1 {484_['wind']['speed']} >= 10 &&
  2 (/California\b/gi).test({142_['features']['0']['properties']['place']})
     && eval({142_['features']['0']['properties']['mag']}) > 5 &&
  3 (/terror\b/gi).test({261_['rss']['channel']['item']['0']['title']})

Search Data Farm                                              🔍
 Keyword
  LA HAZARD
 Tip
  LA wind speed over then 10m/s
  LA earthquake Mag over then 5
  CNN announced terror.
```

[FIG. 14]

[FIG. 15]
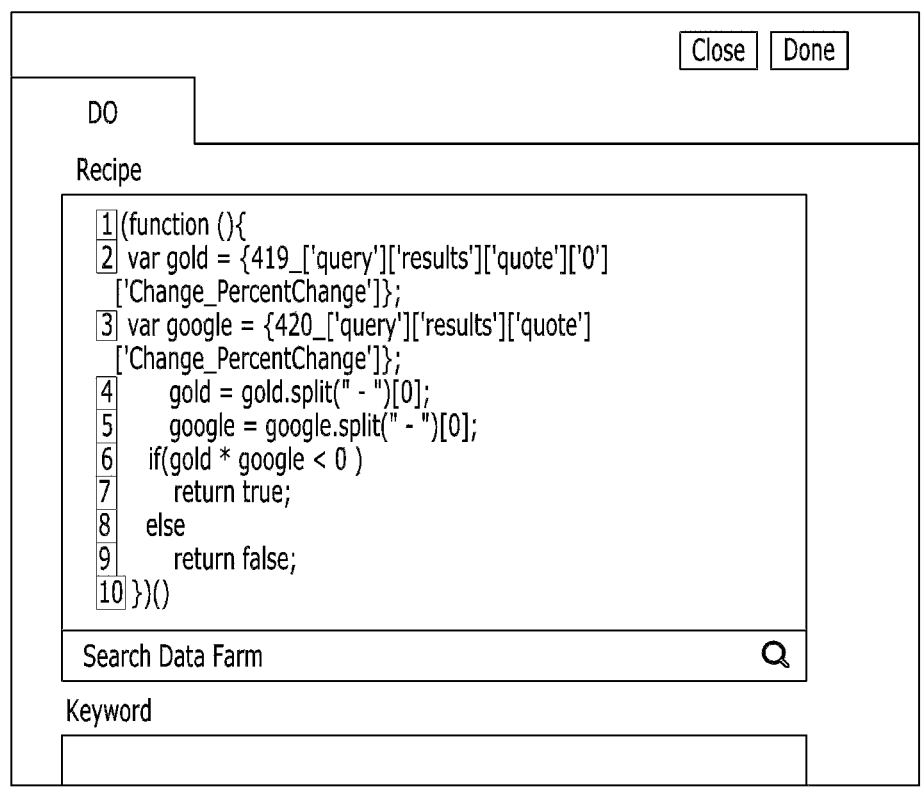

[FIG. 16]

```
1 (function(){
2   var gold = {419_['query']['results']['quote']['0']['Change_PercentChange']};
3   var google = {420_['query']['results']['quote']['Change_PercentChange']};
4   var str = " You can buy " +gold / google;
5       str+= " GOOGLE Stocks with 1 oz of GOLD ";
6   return JSON.stringify({
7       type: "datacook",
8       data: [
9           {
10              contents : str
11          }
12      ]
13  });
14 })()
```

DO

Recipe

Search Data Farm

Keyword

GOLD per GOOG Stock

Tip of GOOGLE Stocks you can buy with 1 oz of GOLD

[FIG. 17]
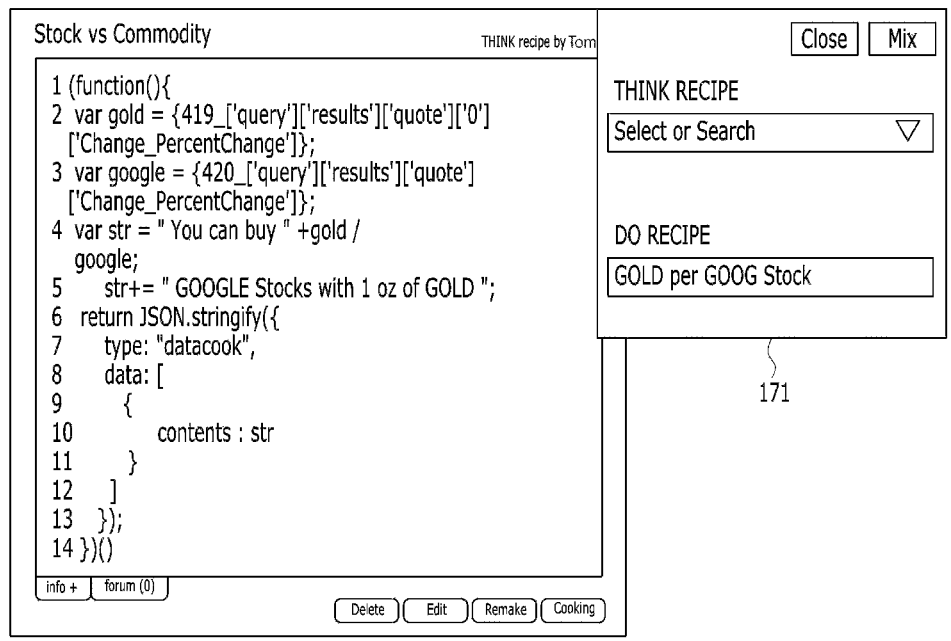
[FIG. 18]

[FIG. 19]
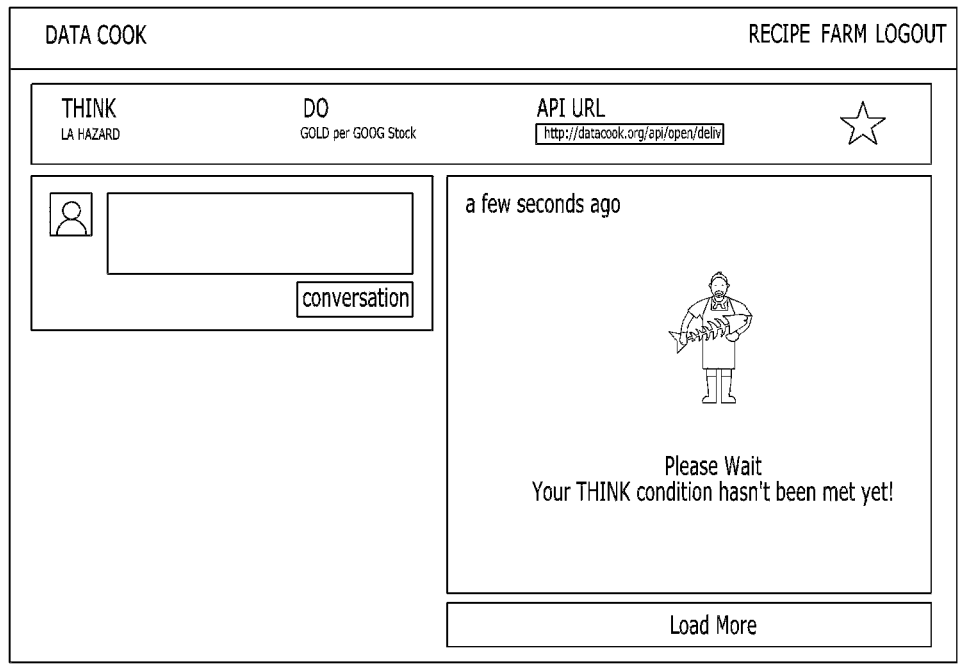

[FIG. 20]
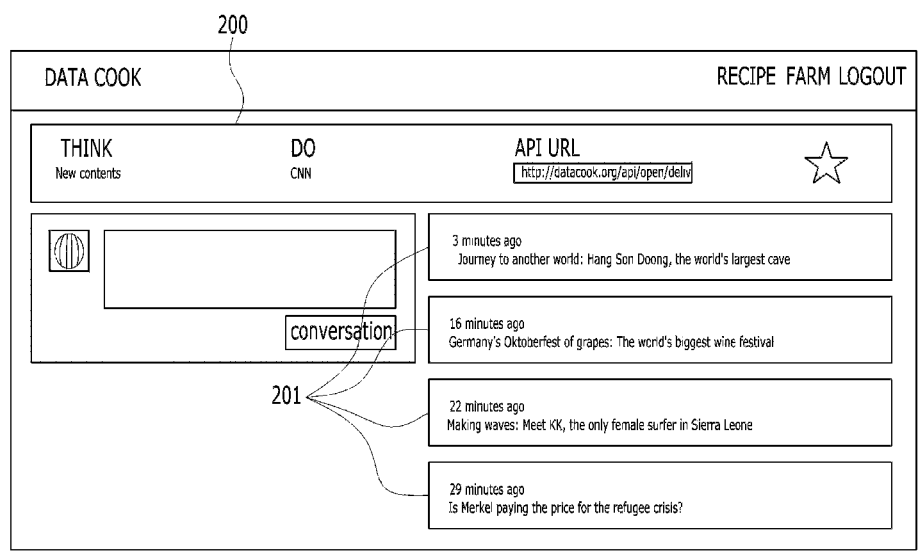

METHOD AND APPARATUS FOR PROCESSING DATA

CROSS-REFERENCE TO RELATED APPLICATIONS

This U.S. non-provisional patent application claims priority under 35 U.S.C. § 119 of Korean Patent Application No. 10-2016-0173491, filed on Dec. 19, 2016, the entire contents of which are hereby incorporated by reference.

BACKGROUND OF THE INVENTION

The present invention disclosed herein relates to a method and apparatus for processing data, and more particularly, to a method and apparatus for processing data can analyze various big data distributed on networks and select only data that a user desires to provide.

It is very difficult for a user to find desired information in big data which are being infinitely produced on Internet to such an extent as to be called a deluge of information. Actually, the analysis of big data is being performed by analysts, and takes a lot of cost and time.

Accordingly, the development of a technology that enables general users, who are end consumers of information, to directly select their desired data to be provided is urgently needed.

SUMMARY OF THE INVENTION

The present invention provides a method and apparatus for processing data, which can provide a service for finding and automatically analyzing and processing the semanticity from the big data when a user sets a desired combination of conditions and actions.

The present invention also provides a method and apparatus for processing data, which can provide a customized data processing service according to demands of individual users, instead of a ready-made service developed by a data provider.

The present invention also provides a method for allowing a user to share a data collection path, an initiation condition, and a data processing method registered by a user with other users, thereby more easily setting requirements for providing desired data.

The present invention also provides an interface method by which even a user who does not have coding knowledge can simply create a condition specification and an action specification.

Embodiments of the present invention provide data processing methods including a processor of a computer system, the processing including: registering a plurality of data farms representing a data collection path; generating and storing a data source that is divided into a plurality of data units according to a hierarchical structure of data provided by the registered data farm and indicates a pointer for accessing each unit data; generating and registering a condition specification including a data source belonging to at least one data farm selected in a condition specification registration process; generating and registering an action specification including a data source belonging to at least one data farm selected in an action specification registration process; generating and storing a data providing specification by mixing the condition specification and the action specification; fetching a corresponding action specification when conditions defined in the condition specification of the data providing specification are satisfied; and processing data collected from the data source included in the corresponding action specification according to operations defined in the fetched action specification, wherein at least one of the condition specification and the action specification includes data sources corresponding to different data farms.

In some embodiments, the generating and registering of the condition specification may include: displaying the selected data farm selected in the condition specification registration process and the data sources corresponding thereto; adding a condition associated with a data source selected according to the inputted condition and the selection result in the condition specification registration process to the condition specification that is being created; and analyzing a condition added to the condition specification, converting the condition into a natural language, and then outputting the natural language on a screen as a tip.

In other embodiments, the generating and registering of the condition specification may include: providing an interface through which a previously registered condition specification for the data farm selected in the condition specification registration process is able to be fetched and modified; and registering a condition specification modified according to an input through the interface as the condition specification of a user.

In still other embodiments, the generating and registering of the action specification may include: providing an interface through which a previously registered condition specification for the data farm selected in the action specification registration process is able to be fetched and modified; and registering an action specification modified according to an input through the interface as the action specification of a user.

In even other embodiments, the processing of the data may include executing the condition specification at a predetermined period and delivering the data processed according to a corresponding action specification when the condition is satisfied.

In yet other embodiments, the processing of the data may include executing the condition specification and providing an open Application Programming Interface (API) address from which the data processed according to a corresponding action specification is able to be acquired from an external system when the condition specification is satisfied.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a view illustrating a network configuration in which a data processing apparatus according to an embodiment of the present invention is interworked with data providing servers and a user device;

FIG. 2 is a flowchart illustrating a process of generating a data providing specification in a data processing method according to an embodiment of the present invention;

FIG. 3 is a flowchart illustrating a process of providing data in accordance with a data providing specification in a data processing method according to an embodiment of the present invention; and FIGS. 4 to 20 are views illustrating interface screens for a service providing data analyzed and processed by a data processing method according to an embodiment of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, terms used herein will be described in brief, and then the present invention will be described in detail.

Terms used in this disclosure are selected as general terms that are being widely used in the present time as possible, but these terms may be changed according to the intention of persons skilled in the arts, precedents, and emergence of new technologies. Also, there are terms arbitrarily selected by the present applicant in a specific case, and in this case, the meanings of them will be described in detail in the explanation part of the corresponding invention. Accordingly, terms used in this disclosure should be defined based on the meaning of the terms and the contents throughout the present invention instead of the simple appellation of the terms.

When it is described throughout the specification that one comprises (or includes or has) some elements, it should be understood that it may comprise (or include or has) only those elements, or it may comprise (or include or have) other elements as well as those elements if there is no specific limitation. Also, the terms such as " . . . unit", " . . . part", and "module" described in this disclosure denote a unit of processing at least one function or operation, and these may be implemented in hardware or software or may be implemented in a combination of hardware and software.

Hereinafter, exemplary embodiments of the present invention will be described in detail with reference to the accompanying drawings so that those skilled in the art can easily carry out the present invention. However, the present invention can be implemented in various types, and is not limited to the embodiments set forth herein. Also, parts irrelevant to the description of the present invention will be omitted for clarification of description, and like parts are indicated as like reference numerals throughout the specification.

FIG. 1 is a view illustrating a network configuration in which a data processing apparatus according to an embodiment of the present invention interworks with data providing servers and a user device.

A data providing server 12 may be a server for producing and distributing big data, and may provide a raw data collection path before being analyzed and processed according to an embodiment of the present invention and then being provided to a user. For example, the data providing server 12 may be a device that provides social network services (SNS) such as Facebook, Twitter, YouTube, Pinterest, Instagram, Tumbler, Lisn.me, Last.fm, or provides Internet services such as Google, Bing, Yahoo, and Baidu providing such as web pages, weather, earthquake information, news, blogs, financial information, sports information, documents.

A server providing such a social network service or an Internet service may also provide an open Application programming interface (API), a Rich Site Summary (RSS), or a Hypertext Markup Language (HTML) document such that other online servers can perform search and collection for data which are produced by the server itself.

A user may access the data processing server 10 through the user device 11, and may use the data processing service provided by the data processing server 10. The user device 11 may include a device such as a personal computer, a portable computer, a smart phone, a tablet PC, or various types of IoT devices, and is not limited in its form. Preferably, a dedicated application or a general-purpose browser may be provided to use the data processing service according to an embodiment of the present invention.

The data processing server 10 according to an embodiment of the present invention may analyze various types of big data produced and distributed by the data providing servers 12, and may process the big data in a form desired by a user and provide the processed data to the user device 11 when conditions desired by a user are satisfied.

The data processing server 10 may be a computing system having a processor, a memory, a network adapter, etc., which communicates with the user device 11 and the data providing server 12 via a network adapter, and performs a data processing method according to an embodiment of the present invention by controlling other components.

The processor may register in the memory a plurality of data farms representing a data collection path through the network adapter; may divide data into a plurality of data units according to a hierarchical structure of the data provided by the registered data farm, generate a data source representing a pointer for accessing each unit data, and store the data source in the memory; may generate a condition specification comprising a data source belonging to at least one data farm selected in a condition specification registration process and register the condition specification in the memory; may generate an action specification comprising a data source belonging to at least one data farm selected in an action specification registration process and register the action specification in the memory; may generate a data providing specification by mixing the condition specification and the action specification, and store the data providing specification in the memory; when conditions defined in the condition specification of the data providing specification are satisfied, may fetch a corresponding action specification from the memory; and may process data collected from a data source comprised in the action specification according to operations defined in the fetched action specification and then provide the processed data to a user.

The data processing method performed by the data processing server 10 will be described in detail below with reference to FIGS. 2 to 20.

A data processing method according to an embodiment of the present invention may be divided into a preprocessing step of processing a registration of a data collection path and a generation of a data providing specification including a condition of a data desired by a user and a processing method, and a postprocessing step of checking whether or not data satisfying conditions are generated and processing and delivering data as a user desires.

FIG. 2 is a flowchart illustrating a preprocessing process generating a data providing specification in a data processing method according to an embodiment of the present invention, and FIG. 3 is a flowchart illustrating a process of providing data in accordance with a data providing specification in a data processing method according to an embodiment of the present invention.

Also, FIG. 4 illustrates an example of a main screen that provides a service according to the data processing method of the present invention.

Referring to FIG. 2, in operation S20, a plurality of data farms representing data collection paths may be registered.

In this embodiment invention, the 'data farm' may mean a data collection path including an address of a data providing server for producing and distributing a large amount of data. That is, the external site addresses corresponding to the data providing server 12 may be registered as a data farm. The type of data provided by the data farm will not be limited. For example, an address from which data such as news information, weather information, earthquake information, stock information, gold price information, and magazine contents can be collected may be registered in the data processing server 10 as a data farm.

The data processing server 10 may manage the list of data farms, and the data farms may be additionally registered by an administrator or user of the server.

Referring to FIG. 4, the whole list of data farms held by the data processing server 10 may be checked through the 'FARM' menu 42 of the main screen. The list of the data farms registered by a logged-in user may be checked in the 'Your FARM' menu 44. A user may register a new data farm, or may add a data farm selected from the whole data farm list to his/her data farm.

By registering an RSS feed or various social feeds known to a user in the data farm of the data processing server 10, he/she may selectively view only desired data among a large amount of data acquired from the corresponding address, and may be provided with data processed in a form that he/she desires. Also, when a user desires, the user may share his/her registered data farm with other users.

FIG. 5 illustrates a screen of checking a data farm list.

When the 'FARM' menu 42 or the 'Your FARM' menu 44 is selected in the process of FIG. 4, the whole data farm list currently registered or the data farm list registered by a user can be checked as shown in FIG. 5. Also, a new data farm may be registered by clicking the addition button 51.

Referring to FIG. 5, the data farm list may include a keyword 52 corresponding to a title of a registered data farm and a data collection path, i.e., an address 53 of an external site that provides data. In this process, when a user clicks the keyword 52, the data source list for the corresponding data farm can be viewed. Also, when the address 53 is clicked, a user may visit the corresponding external site, and may see the information that the corresponding site provides.

The 'Data Source' may include information indicating a unit of data provided by the corresponding data farm, and may be information generated by the data processing apparatus 10 when registering the data farm.

FIG. 6 illustrates a screen of registering a data farm list.

In the registration process of FIG. 6, as information on the data farm to be registered, when an address, a keyword, whether or not to share the data, and whether or not to post the data are inputted and 'Done' is clicked, a new data farm may be registered in the data processing server 10.

The address may be inputted into the 'URL' field, and the CNN RSS information providing address may be inputted in the example of FIG. 6. The data processing server 10 according to the embodiment may periodically visit registered URLs to confirm and analyze information.

The keyword may be inputted into the 'Keyword' field, and may correspond to the title of the data farm to be registered. Thus, keyword information for distinguishing this data farm from other data farms may be inputted.

Whether or not to share may be selected by the 'Public' field, and may indicate whether or not to share the registered data farm with other users.

Whether or not to post data may be selected by the 'Advance' field, and may indicate whether or not a user desires to directly input data to the data farm by a post method via a wearable device, a mobile device, a sensor, or a user's web site.

In operation S22, the data processing server 10 may divide the data into a plurality of data units according to a hierarchical structure of data provided from the registered data farm, and may generate and store a data source that indicates a pointer for accessing each unit data.

That is, upon initial registration of the data farm, the corresponding data collection path may be parsed to analyze and divide the hierarchy of data, and the data sources corresponding to the pointers for accessing the divided unit data may be stored.

In case of a data providing server in which data having a certain semantic property are included in a specific location and each unit data (data element) can be pointed by a data source, a registration object of the data farm may not be limited by service type and provision method. The data pointed to by the data source may not be necessarily texts, and may be any type of data such as images and videos.

FIG. 7 illustrates a screen for parsing registered data farm to hierarchize and store data sources.

The example of FIG. 7 may list the data sources generated for the 'NEWS (CNN)' data farm providing news information, and the data sources may have a hierarchical structure as shown in FIG. 7.

Data producers such as CNN who share information with other services may continuously produce, store, and share new information in a specific data structure that is pre-arranged. The data processing apparatus 10 according to an embodiment of the present invention may provide an interface which can parse the data structure of such a data farm to acquire data sources and can create a condition specification and an action specification using these data sources.

Data farms that share data may independently define the name of the data source, and when a specific data source is called from the outside, may send pre-arranged data for the specific data source. For example, in the 'NEWS (CNN)' data farm of FIG. 7, 'rss> channel> title' may be used as the source name corresponding to the title of the information, but in another weather site, 'rss> channel> name' may be defined as the name of the source corresponding to the time.

Any data type that can be parsed, including json and xml, may be used as the format of the data shared through the data source.

Referring to FIG. 7, the data source 'rss> channel> title' 71 may be a pointer accessible to the unit data corresponding to the title of the CNN news that are being, and the data source 'rss> channel> description' 72 may be a pointer accessible to the unit data corresponding to the description of the corresponding news. Also, the data source 'rss> channel> link' 73 may be a pointer accessible to the unit data corresponding to the CNN link of the corresponding news.

As described above, data providing services such as RSS may have independently defined data structures. In this embodiment, when the corresponding data collection path is registered as a data farm, the data providing service may parse the unique data structure to divide into a plurality of unit data, and may create the pointer information for accessing each unit data as the data sources.

In operation S24, a condition specification may be generated and registered. The condition specification may include a data source belonging to at least one selected data farm. By creating the condition specification in the condition specification registration process, the conditions of data to be provided may be set.

The subject of data farm selection and data condition setting may be preferably a user, but may not be necessarily selected or set directly by a user, and may also be selected or set by objects including various IoT devices.

In the condition specification registration process, the selected data farm and the corresponding data sources may be shown. Also, the condition specification may be completed by adding the conditions related to the selected data source to the condition specification that is being created, in accordance with the selection and condition input of a user (or object).

In addition, a keyword and a tip corresponding to the title may be inputted as metadata for the condition specification. The tip may be information corresponding to a description or comment on the condition specification. Since the code described in the condition specification may be difficult to interpret at first glance, it may be useful to input the description into the tip when a user checks or modifies the condition specification later. Also, when a user shares this condition specification with other users, it may be easy for other users to understand what conditions the condition specification includes.

According to an exemplary embodiment of the present invention, a condition to be added to a condition specification that is being created may be interpreted and converted into a natural language, and then may be displayed as a tip on the screen, thereby automatically generating the tip or enabling a user to input the tip.

FIG. 8 illustrates a screen shown when the 'RECIPE' menu 41 is selected in the main process of FIG. 4, and lists the condition specification and the action specification registered in the data processing server 10.

Also, when a user selects 'Your RECIPE' menu 43 in the main process of FIG. 4, he/she may see the list of the condition specification and the action specification registered by himself/herself.

In this embodiment, 'THINK RECIPE' may mean a condition specification, and 'DO RECIPE' may mean an action specification. The recipe or specification may include a simple algorithm that describes a condition or action desired by the user as shown in FIG. 8.

According to an embodiment of the present invention, a user may select a desired data palm while reading descriptions or keywords of the data palm(s) shared among the data palms previously registered by other users and the data palm(s) registered by himself/herself, and may create the condition specification or the action specification using the data sources included in the selected data farm.

A user can create his/her own recipe when he/she creates a condition specification or an action specification, but he/she may recall the recipes that other users have registered and share, and then may make his/her own recipes by modifying the recipes.

When a user chooses to remake a recipe similar to his/her desired contents in the recipe list shown in FIG. 8, an interface for the remake may be provided. The condition specification modified according to the user's input through this interface may be registered as the condition specification of a user.

FIG. 9 illustrates a screen for creating a new recipe.

Referring to FIG. 9, a tab 91 for creating a 'THINK RECIPE' (condition specification) and a tab 92 for creating a 'DO RECIPE' (action specification) may be included in one screen.

A simple algorithm using code or pseudo code may be inputted into the 'Recipe' field. In the case of 'THINK RECIPE', the inputted algorithm may define a condition for providing data, and in the case of 'DO RECIPE', may define a processing operation for providing data.

The code creation in the 'Recipe' field may be processed in a What You See Is What You Get (WYSIWYG) way, which allows a user to select the data source and logical operator and to easily complete a conditional expression in a way of inputting only constants of a logical expression.

When the 'Recipe' field is clicked, a desired data farm may be retrieved and/or selected.

FIG. 10 illustrates a screen for retrieving a data farm desired by a user to create a condition specification. When a user selects a data farm of the title 'Weather USA LA' from the retrieved data farms, the data resources of the corresponding data farm may be listed as shown in FIG. 11.

When a user selects a data source that he/she wants to include in the condition specification, a code may be automatically generated in the 'Recipe' field such that he/she can easily complete the conditional expression using the corresponding data source.

In the example of FIG. 11, it can be seen that a user selects a data source of 'wind> speed' 110, and as a result, a code line 121 including identification information of the selected data source and the data farm corresponding thereto as shown in FIG. 12 is automatically described in the 'Recipe' field. A data source indicating data corresponding to the wind speed among LA weather information may be inputted in the recipe. Since the data source is a pointer for the unit data, the latest wind speed data at that time may be included in the conditional expression whenever this recipe is executed in the future.

FIG. 13 illustrates a screen on which the creation of the "THINK RECIPE" of FIG. 12 is completed.

Referring to FIG. 13, it can be seen that a code for limiting the data source called 'wind> speed' to be greater than or less than 10 is inputted. The conditional operator may be implemented so to be inputted or selected by a user.

Also, it can be seen that conditions including the data sources of the other data farms are inputted in the code lines #2 and #3 by a user.

The condition specification completed in FIG. 13 may define the conditions that 'the wind speed of LA is more than 10 m/s, an earthquake of magnitude 5 or more occurs in California, and CNN news announces a terror'. It may be set to determine whether or not the initiation condition is satisfied by analyzing specific data source values of three different data farms.

Thus, according to an embodiment the present invention, data sources belonging to a plurality of data farms may be entered in one condition specification, thereby making it possible to create a condition specification that can satisfy various needs of the user.

Also, 'LA HAZARD' may be inputted as a keyword or title of the condition specification in the 'Keyword' field, and a detailed description of the condition specification may be automatically generated or inputted in the 'tip' field.

Referring again to FIG. 2, in operation S26, an action specification including a data source belonging to at least one data farm selected by a user (or object) may be created and registered. This operation may be performed in the action specification registration process.

Also, a user may newly create the action specification, i.e., 'DO RECIPE', by selecting a data farm and data source in a similar method to the condition specification, or may reuse an existing recipe, modify a desired part of the recipe, and then register the modified recipe as his/her own action specification.

In addition, a keyword and a tip corresponding to the title may be inputted as metadata for the action specification. The tip may be information corresponding to a description or comment on the action specification. Since the code described in the action specification may be difficult to interpret at first glance, it may be useful to input the description into the tip when a user checks or modifies the action specification later. Also, when a user shares this action specification with other users, it may be easy for other users to interpret the performance contents of the action specification.

FIGS. 14 to 16 illustrate screens for creating a user's own action specification using an action specification registered in the existing data processing server 10.

FIG. 14 is a view illustrating a screen on which a previously registered recipe is shown. Here, when 'Remake' is selected, an interface screen for editing the corresponding algorithm may be displayed as shown in FIG. 15.

In the process shown in FIG. 15, a desired data farm and data source may be additionally selected to modify an existing recipe, and a keyword and a tip may be inputted to remake the previously registered recipe as a user's own action specification.

FIG. 16 illustrates a screen on which a recipe registered and shared by another user is appropriately edited. A completely different recipe may be made by partially applying a code of another user. In this recipe, the price of Google stock and the price of one ounce of gold may be fetched from a data farm corresponding to Yahoo API, and then the number of Google stocks that can be bought at one ounce of gold may be calculated. As a result of calculation, the recipe may include a code that returns a string in a form of json.

Thus, according to an embodiment of the present invention, an action specification that instructs to process data by combining two or more data sources may be created. In addition, the action specification may be constructed with a data farm or data source different from the data farm or data source used to create the corresponding condition specification.

That is, when data at a specific location on a network satisfy a specific condition, it may be possible to set such that an operation of processing and outputting data at a different independent location on the network is performed.

In the above example, an action specification registration screen requiring a minimum coding knowledge is illustrated. Similarly to the condition specification registration process shown in FIGS. 12 and 13, in the action specification registration process, a template may also be created by pre-typing an arbitrary phrase, and a value indicated by an arbitrary source may be put among the template to create a message including texts and images. A user can easily create an action specification using this template.

According to an embodiment of the present invention, at least one of the condition specification and the action specification may include a plurality of data sources corresponding to different data farms. That is, the condition specification and the action specification may be set by combining data provided by different data providing servers on the network.

In operation S28, a data providing specification may be generated and stored by mixing the condition specification and the action specification. In this case, the data providing specification may be stored so as to be associated with the corresponding user account.

FIG. 17 illustrates a screen for generating a data providing specification by combining a condition specification and an action specification.

The condition specification and the action specification may be generated and registered independently of each other, and a user may generate the data providing specification by selecting and mixing any combination of the condition specification and the action specification.

Referring to FIG. 17, when a 'Cooking' button is clicked in regard to the action specification 'GOLD per GOOG Stock' that is being created in the process, a popup window 171 for generating a data providing specification may be displayed. In this popup window, a user may select or search for a desired condition specification, i.e., 'THINK RECIPE'.

FIG. 18 illustrates a screen for retrieving and selecting a condition specification in the data providing specification registration process. When a user selects the conditional specification with the keyword 'LA HAZARD' and clicks the 'Mix' button, a data providing specification in which the condition specification 'LA HAZARD' and the action specification 'GOLD per GOOG Stock' are mixed may be generated.

In addition, the generated data providing specification may be registered in the data processing apparatus 10, and may be stored so as to be associated with the account of a user who generates the data providing specification.

The registered data providing specification may be executed periodically or whenever new data are updated for a data source included in the corresponding condition specification.

FIG. 3 is a flowchart illustrating a process of executing a data providing specification and providing data desired by a user.

Referring to FIG. 3, in operation S30, the condition specification included in the registered data providing specification may be executed. The condition specification may be executed in a certain cycle, or may be executed whenever new data are added to the associated data source.

In operation S32, it may be determined whether or not the condition(s) defined in the executed condition specification are satisfied. If the condition is not satisfied, the process may return to operation S30 to execute the condition specification again at a designated time, and if the condition is satisfied, the process may proceed to operation S34 to read the corresponding action specification.

In operation S36, the actions defined by the read action specification may be performed. That is, data may be obtained from a plurality of data sources included in the corresponding action specification according to the algorithm of the action specification, and the obtained data may be processed.

In the case of the action specification according to the examples of FIGS. 17 and 18, if the condition specified in 'LA HAZARD' is satisfied, the gold price and the Google stock price at that time point may be obtained, and then the number N of Google stocks per one ounce of gold may be calculated. Thereafter, a message 'You can buy N GOOGLE Stocks with 1 OZ of GOLD' may be generated as processed data.

In operation S38, the processed data may be provided to a user who has registered the data providing specification.

FIG. 19 illustrates a data providing screen corresponding to a combination of the condition specification and the action specification registered by a user, i.e., the data providing specification.

Referring to FIG. 19, data processed according to the condition specification specified in the 'THINK' field and the action specification specified in the 'DO' field may be provided on the right side of the screen, and it can be seen that a situation satisfying the condition has not yet arrived.

According to the data providing specification shown in FIG. 19, when the wind speed of Los Angeles is larger than or equal to 10 m/s, an earthquake of magnitude 5 or more occurs in California, and a terror is mentioned in CNN (THINK), the number N of Google stocks which can be currently bought with one ounce of gold may be outputted (DO).

Also, in this embodiment, a published Application Programming Interface (API) address may be provided so as to acquire data processed according to the corresponding action specification from an external system when the condition specification included in the data providing specification registered by a user is executed and the conditions are satisfied. This may be information displayed in the 'API URL' field of FIG. 19. This API URL may be an open API address published such that information processed and stored in the latest order can be exported to the outside. Accordingly, a user may export result data analyzed and processed according to the data providing specification to sites outside the data processing apparatus 10 using the API URL information, and may use the result data.

FIG. 20 is view illustrating another example of the data providing screen corresponding to the data providing specification registered by a user.

Referring to FIG. 20, a message 201 provided by a combination 200 of a condition specification and an action specification may be shown in the order of generation time. That is, the latest data may be disposed at the top such that a user can most easily check the latest data.

Thus, the data processing server 10 may periodically generate and deliver a message to be provided to a user according to a combination of the condition specification and the action specification. FIGS. 19 and 20 are views illustrating screens of a user account allowing a user to see at a glance whether or not there is a new message delivered.

According to an embodiment of the present invention, a service for finding and automatically analyzing and processing the semanticity from various types of big data existing at different locations on a network can be provided when a user sets a desired combination of conditions and operations.

Also, a customized data processing service according to demands of individual users can be provided instead of a ready-made service developed by a data provider.

Also, a method of more easily setting requirements for providing desired data can be provided by allowing a user to share data collection paths, initiation conditions, and data processing methods registered by users.

In addition, an interface method by which even a user who does not have coding knowledge can simply create a condition specification and an action specification can be provided.

Although a single server and a single user device have been described above, it will be apparent that a plurality of servers or a plurality of user devices can be implemented so as to dividedly process the respective operations under a distributed computing environment. In addition, it will be apparent that a portion of the operations described as being executed by the server can also be implemented as being executed by the user device.

In the above description, a user has directly generated, edited, and registered the condition specification and the action specification. However, this is merely an example, and the generation, the edition, and the registration of the condition specification and the action specification need not necessarily be performed only by a user's action, and may be performed by artificial intelligence mounted on a user device or by a separate computer system mounted with artificial intelligence.

A method according to an embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A data processing method performed by a processor of a computer system, the processing comprising:
   registering a plurality of data farms, each of the plurality of data farms representing a data collection path;
   dividing data provided by each of the plurality of data farms into a plurality of data units according to a preset hierarchical structure of the data, and generating and storing a plurality of data sources that each indicate a pointer for accessing one of the plurality of data units;
   generating and registering a condition specification comprising a data source that belongs to at least one data farm selected among the plurality of data farms in a condition specification registration process, wherein the data source in the condition specification is selected among the plurality of data sources by a user;
   generating and registering an action specification comprising a data source that belongs to at least one data farm selected among the plurality of data farms in an action specification registration process, wherein the data source in the action specification is selected among the plurality of data sources by the user and wherein the condition specification and action specification are generated independently from each other;
   generating and storing a data providing specification in response to the user's mixing the condition specification and the action specification;

fetching a corresponding action specification when conditions defined in the condition specification of the data providing specification are satisfied; and processing data collected from the data source comprised in the corresponding action specification according to operations defined in the fetched action specification, wherein at least one of the condition specification and the action specification comprises data sources corresponding to different data farms, wherein, responsive to updating a data farm with a new data, an action specification of a corresponding data providing specification is fetched when conditions defined in a condition specification of the corresponding data providing specification are satisfied and wherein the new data is processed according to conditions defined in the fetched action specification.

2. The data processing method of claim 1, wherein the generating and registering of the condition specification comprises:

displaying the selected data farm selected in the condition specification registration process and the data sources corresponding thereto;

adding a condition associated with a data source selected according to the inputted condition and the selection result in the condition specification registration process to the condition specification that is being created; and analyzing a condition added to the condition specification, converting the condition into a natural language, and then outputting the natural language on a screen as a tip.

3. The data processing method of claim 1, wherein the generating and registering of the condition specification comprises:

providing an interface through which a previously registered condition specification for the data farm selected in the condition specification registration process is able to be fetched and modified; and registering a condition specification modified according to an input through the interface as the condition specification of a user.

4. The data processing method of claim 1, wherein the generating and registering of the action specification comprises:

providing an interface through which a previously registered condition specification for the data farm selected in the action specification registration process is able to be fetched and modified; and registering an action specification modified according to an input through the interface as the action specification of a user.

5. The data processing method of claim 1, wherein the processing of the data comprises:

executing the condition specification at a predetermined period and delivering the data processed according to a corresponding action specification when the condition is satisfied.

6. The data processing method of claim 1, wherein the processing of the data comprises:

executing the condition specification and providing an open Application Programming Interface (API) address from which the data processed according to a corresponding action specification is able to be acquired from an external system when the condition specification is satisfied.

7. A computer system comprising a processor, a memory, and a network adapter, wherein the processor:

registers in the memory a plurality of data farms, each of the plurality of data farms representing a data collection path through the network adapter;

divides data provided by each of the plurality of data farms into a plurality of data units according to a preset hierarchical structure of the data, generates a plurality of data sources that each represent a pointer for accessing one of the plurality of data units, and stores the plurality of data sources in the memory;

generates a condition specification comprising a data source that belongs to at least one data farm selected among the plurality of data farms in a condition specification registration process and registers the condition specification in the memory, wherein the data source in the condition specification is selected among the plurality of data sources by a user;

generates an action specification comprising a data source that belongs to at least one data farm selected among the plurality of data farms in an action specification registration process and registers the action specification in the memory, wherein the data source in the action specification is selected among the plurality of data sources by the user and wherein the condition specification and action specification are generated independently from each other;

generates a data providing specification by mixing the condition specification and the action specification, and stores the data providing specification in the memory;

when conditions defined in the condition specification of the data providing specification are satisfied, fetches a corresponding action specification from the memory; and processes data collected from a data source comprised in the action specification according to operations defined in the fetched action specification, and at least one of the condition specification and the action specification comprises data sources corresponding to different data farms, wherein, responsive to updating a data farm with a new data, an action specification of a corresponding data providing specification is fetched when conditions defined in a condition specification of the corresponding data providing specification are satisfied and wherein the new data is processed according to conditions defined in the fetched action specification.

* * * * *